(12) United States Patent
Storage et al.

(10) Patent No.: US 11,029,103 B2
(45) Date of Patent: *Jun. 8, 2021

(54) DUAL SEATED BY-PASS VALVE FOR SURFACE COOLERS

(71) Applicant: Unison Industries, LLC, Jacksonville, FL (US)

(72) Inventors: Michael Ralph Storage, Beavercreek, OH (US); Dennis Alan McQueen, Miamisburg, OH (US)

(73) Assignee: Unison Industries, LLC, Jacksonville, FL (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/444,546

(22) Filed: Jun. 18, 2019

(65) Prior Publication Data

US 2019/0301820 A1 Oct. 3, 2019

Related U.S. Application Data

(60) Continuation of application No. 15/809,369, filed on Nov. 10, 2017, now Pat. No. 10,345,057, which is a
(Continued)

(51) Int. Cl.
*F01P 3/00* (2006.01)
*F28F 27/02* (2006.01)
(Continued)

(52) U.S. Cl.
CPC .............. *F28F 27/02* (2013.01); *F16K 11/02* (2013.01); *F16K 31/002* (2013.01); *F28D 1/0233* (2013.01); *F28D 1/0246* (2013.01); *F28F 3/02* (2013.01); *F28D 2021/0021* (2013.01); *F28D 2021/0089* (2013.01); *F28F 1/022* (2013.01); *F28F 3/048* (2013.01); *F28F 3/12* (2013.01); *F28F 2250/06* (2013.01)

(58) Field of Classification Search
CPC ................ F28D 1/0233; F28D 1/0246; F28D 2021/0021; F28D 2021/0089; F28F 27/02; F28F 3/02; F28F 1/022; F28F 3/048; F28F 3/12; F28F 2250/06; F16K 11/02; F16K 31/002
USPC ......................................................... 165/51
See application file for complete search history.

(56) References Cited

U.S. PATENT DOCUMENTS 1,842,825 A 1/1932 Cunningham
2,400,615 A 5/1946 Warrick et al.
(Continued)

FOREIGN PATENT DOCUMENTS

EP 2696056 A2 2/2014
GB 2485653 5/2012
(Continued)

*Primary Examiner* — Davis D Hwu
(74) *Attorney, Agent, or Firm* — McGarry Bair PC

(57) ABSTRACT

A heat exchanger circuit can include a heat exchanger having a body with a plurality of cooling fins for the heat exchanger, a plurality of core cooling channels within the body, a plurality of de-congealing channels in fluid communication with the plurality of core cooling channels, and a by-pass valve in fluid communication with the plurality of core cooling channels and the plurality of de-congealing channels.

20 Claims, 8 Drawing Sheets

Related U.S. Application Data division of application No. 15/023,980, filed as application No. PCT/US2014/056745 on Sep. 22, 2014, now abandoned.

(60) Provisional application No. 61/880,937, filed on Sep. 22, 2013.

(51) Int. Cl.

| | | |
|---|---|---|
| *F16K 11/02* | (2006.01) | |
| *F16K 31/00* | (2006.01) | |
| *F28D 1/02* | (2006.01) | |
| *F28F 3/02* | (2006.01) | |
| *F28F 3/04* | (2006.01) | |
| *F28F 3/12* | (2006.01) | |
| *F28F 1/02* | (2006.01) | |
| *F28D 21/00* | (2006.01) | |

(56) References Cited

U.S. PATENT DOCUMENTS

| | | |
|---|---|---|
| 3,339,586 A | 9/1967 | Tenkku et al. |
| 7,454,894 B2 | 11/2008 | Larkin et al. |
| 7,946,806 B2 | 5/2011 | Murphy |
| 8,387,362 B2 | 3/2013 | Storage et al. |
| 9,765,694 B2 | 9/2017 | Storage et al. |
| 10,345,057 B2 * | 7/2019 | Storage ................ F28D 1/0246 |
| 2008/0095611 A1 | 4/2008 | Storage et al. |
| 2010/0043396 A1 | 2/2010 | Coffinberry |
| 2012/0125594 A1 | 5/2012 | Elder |
| 2012/0285138 A1 | 11/2012 | Todorovic |
| 2013/0011246 A1 | 1/2013 | Todorovic |
| 2014/0044525 A1 | 2/2014 | Storage et al. |
| 2016/0115864 A1 | 4/2016 | Campbell et al. |

FOREIGN PATENT DOCUMENTS

| | | |
|---|---|---|
| JP | 41001497 B1 | 2/1966 |
| JP | 60121598 U | 8/1985 |
| WO | 2011155952 A1 | 12/2011 |
| WO | 2013018203 A1 | 2/2013 |
| WO | PCTUS2014040723 | 6/2014 |

* cited by examiner

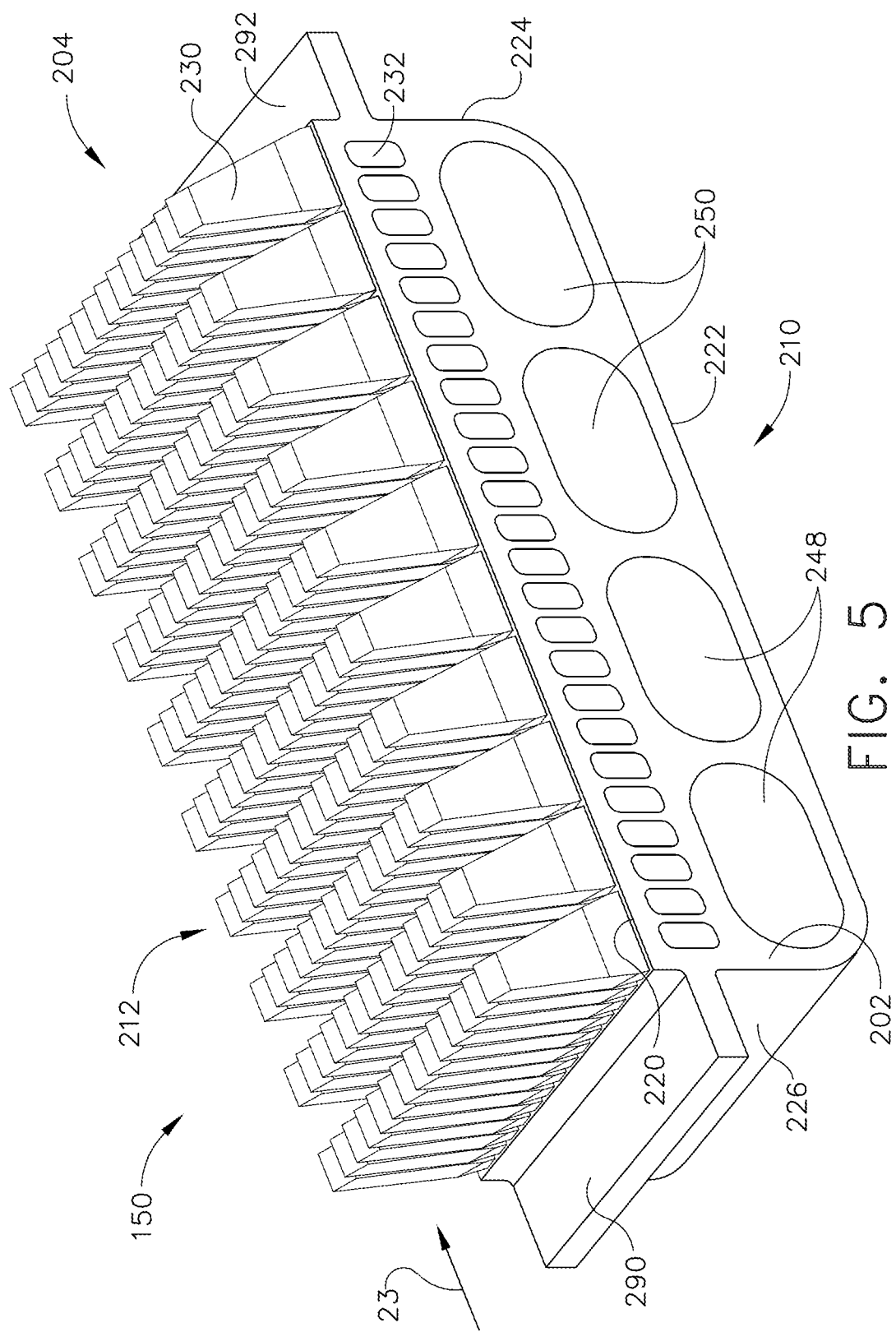

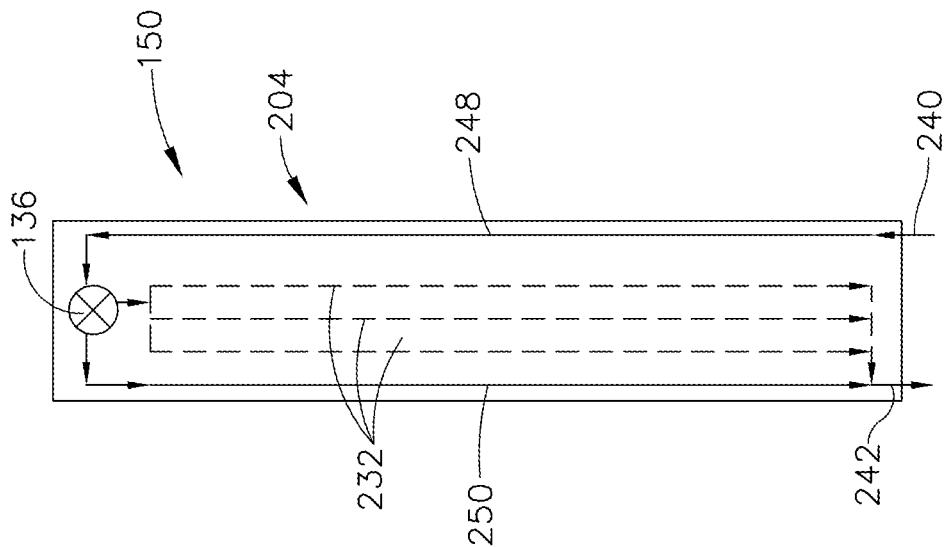
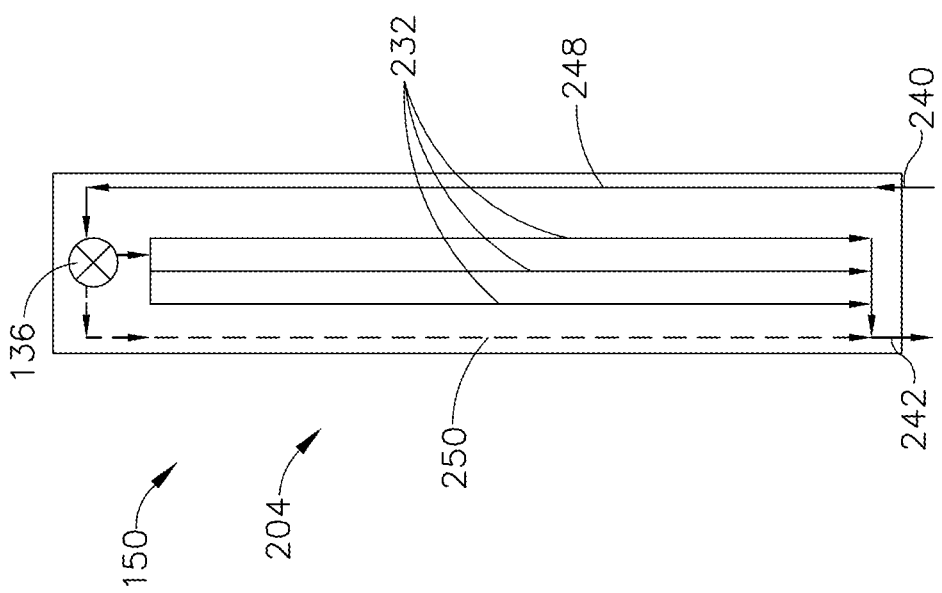

DUAL SEATED BY-PASS VALVE FOR SURFACE COOLERS

CROSS-REFERENCE TO RELATED APPLICATIONS

This application is a continuation of U.S. Pat. No. 10,345,057 entitled "Dual Seated By-Pass Valve for Surface Coolers," filed Nov. 10, 2017, which is a divisional of U.S. patent application Ser. No. 15/023,980 entitled "Dual Seated By-Pass Valve for Surface Coolers," filed Mar. 22, 2016, which claims priority to the prior filed, PCT application serial number PCT/US2014/056745, filed on Sep. 22, 2014, which claims priority to U.S. Patent Application Ser. No. 61/880,937, titled "Dual Seated By-Pass Valve for Surface Coolers" filed Sep. 22, 2013. The above-listed applications are herein incorporated by reference.

BACKGROUND

The present embodiments generally pertain to heat exchangers utilized with gas turbine engines. More particularly, the present embodiments relate to surface conforming heat exchangers which utilize a dual seated by-pass valve.

In a gas turbine engine, air is pressurized in a compressor and mixed with fuel in a combustor for generating hot combustion gases which flow downstream through turbine stages. A typical gas turbine engine generally possesses a forward end and an aft end with its several core or propulsion components positioned axially therebetween. An air inlet or intake is located at a forward end of the gas turbine engine. Moving toward the aft end, in order, the intake is followed by a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list. In a typical turbo-prop gas turbine engine aircraft, turbine stages extract energy from the combustion gases to turn a turbo-propeller. In some embodiments, the propulsor may power one or more turbo-propellors (hereinafter, "turbo-prop") in the case of some airplanes. In alternate embodiments, the propulsor may drive one or more turbo-propellers, embodied as rotors, for operation of a helicopter.

During operation, significant heat is generated by the combustion and energy extraction processes with gas turbine engines. It is necessary to manage heat generation within the engine so as not to raise engine temperatures to unacceptable levels, which may cause engine failure. One method of controlling heat and improving engine life is to lubricate engine components and cool lubricating fluids. In such heat exchanger embodiments, the air stream is utilized to cool the hot fluid of the turbine engine.

Certain valve arrangements may be utilized wherein when engine cooling fluid is hot, the valve arrangement causes the cooling fluid to flow only through the core of the heat exchanger. In some embodiments, when the engine cooling fluid is cool, the valves allow simultaneous flow through core portion of the heat exchanger and de-congeal channels.

However, when the engine is non-operational or is operating in circumstances where the engine is subjected to subzero temperatures, cooling of the lubricating fluid is not required. In fact, it may be the case that cooling of the fluid in these conditions may cause freezing of water in engine fuel within the engine creating blockages with potentially catastrophic results. In these sub-zero conditions, the lubricating fluid may be, or may become, congealed, that is the fluid may have high viscosity and more resistant to flow, having increased operating pressure.

It would be desirable to overcome these situations and allow for controlled heating of the heat exchanger to de-congeal without necessarily passing fluid also through the core cooling channels of the heat exchanger.

The information included in this Background section of the specification, including any references cited herein and any description or discussion thereof, is included for technical reference purposes only and is not to be regarded subject matter by which the scope of the innovation is to be bound.

SUMMARY

According to present embodiments, a conformal surface heat exchanger is provided. The heat exchanger conforms to the surface of an aircraft, such as an airplane or helicopter. The heat exchanger is positioned in the airflow path of the turbo-prop of the aircraft to provide fluid-to-air heat exchange and cooling of engine fluid while improving engine performance. The heat exchanger may utilize a by-pass valve which allows flow through de-congealing channels to limit cooling of engine fluid and to use engine heat to warm the heat exchanger and de-congealing fluid therein.

According to some aspects, a by-pass valve for a heat exchanger comprises a valve body, a power element extending through the valve body, a de-congealing flow path passing through the valve body, and a core cooling flow path passing through the valve body. A de-congealing poppet is in fluid communication with the de-congealing flow path and operably connected to the power element, the de-congealing poppet being movable between a first closed position and a second open position. A core cooling poppet is in fluid communication with said core cooling flow path, the core cooling poppet being operably connected to the power element. Optionally, when the core cooling poppet is open, the de-congealing poppet is seated closed and cooling fluid passes through the valve body through the core cooling path. Further, when the core cooling poppet is closed, the de-congealing poppet is open and substantially all of cooling fluid passes through the valve body through the de-congealing flow path.

According to some aspects, a heat exchanger circuit comprises a heat exchanger for liquid to air heat exchange having an extension body including a plurality of cooling fins for the heat exchange, a first plurality of core cooling channels within the body arranged closer to the plurality of cooling fins, the first plurality of core cooling channels having at least one cooling inlet in flow communication with hot engine fluid conduit and a cooling outlet. A second plurality of de-congealing channels disposed in the body, the de-congealing channels having at least one de-congealing inlet and a de-congealing outlet. A by-pass valve is in receiving fluid communication with the cooling outlet and the de-congealing outlet and output fluid communication with a fluid reservoir. The by-pass valve had dual poppets which allow for engine fluid flow through two paths within said by-pass valve.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present innovation is provided in the following written description of various embodiments of the innovation, illustrated in the accompanying drawings, and defined in the appended claims.

BRIEF DESCRIPTION OF THE ILLUSTRATIONS

The above-mentioned and other features and advantages of these exemplary embodiments, and the manner of attaining them, will become more apparent and the by-pass valve for a surface heat exchanger will be better understood by reference to the following description of embodiments taken in conjunction with the accompanying drawings, wherein:

FIG. 5 is a perspective cross-sectional view of the heat exchanger assembly;

FIG. 6 is a schematic illustration of a first mode of operation through the heat exchanger assembly;

FIG. 7 is a schematic illustration of a second mode of operation through the heat exchanger assembly;

DETAILED DESCRIPTION

Figure 1:
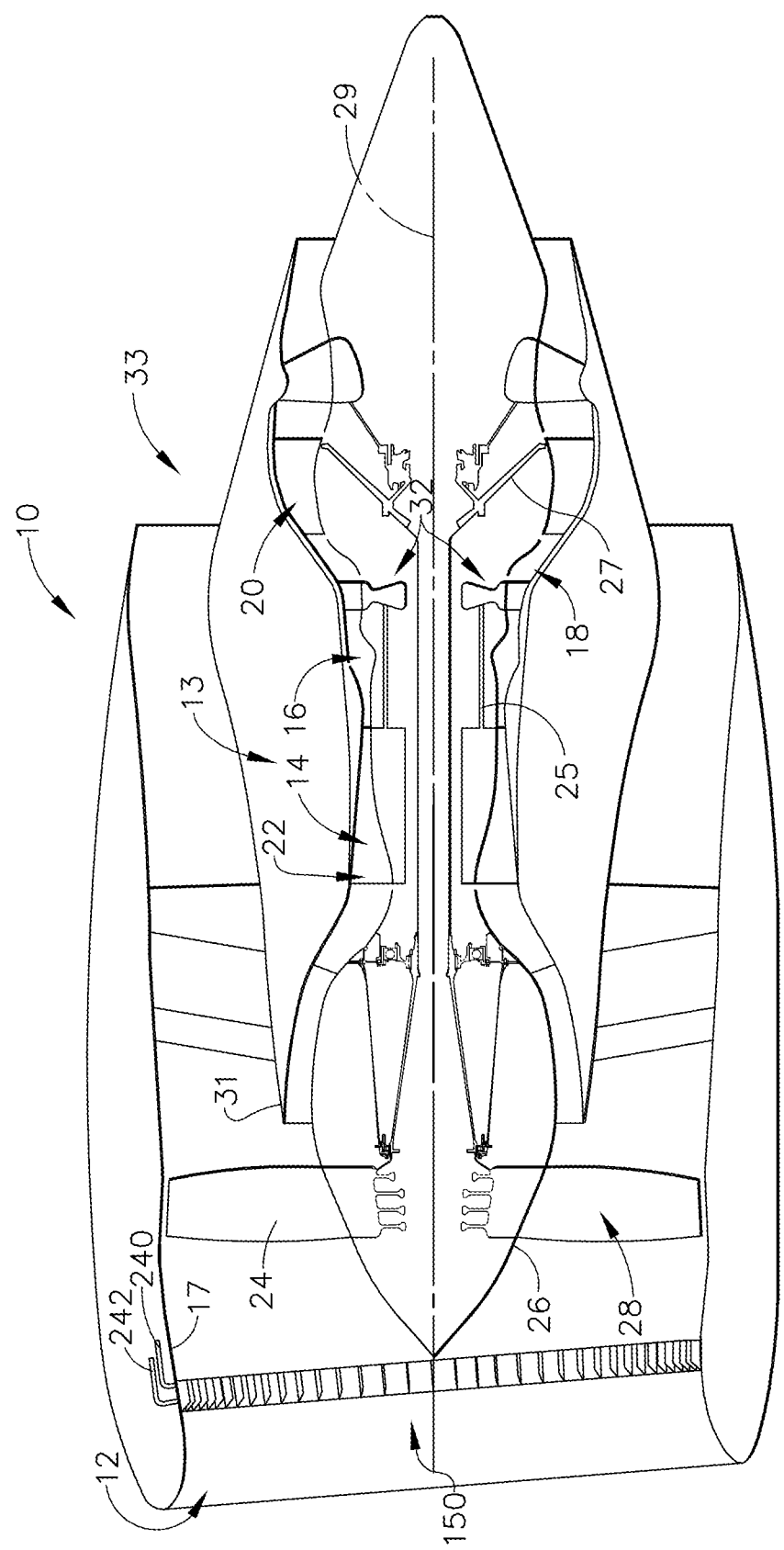
FIG. 1 is a schematic illustration of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present innovation covers such modifications and variations as come within the scope of the appended claims and their equivalents.

Referring to FIGS. 1-9, various embodiments of aircraft heat exchangers are depicted. The heat exchanger may be utilized on flow path surfaces within the by-pass flow area or in the inlet area of a turbine engine. Alternatively, heat exchangers may be used on the external surfaces of an aircraft, such as an airplane or helicopter wherein the rotor wash from the propeller or rotor blades moves air over the heat exchanger to cool engine cooling fluid, such as bearing oil for example. The heat exchanger includes a by-pass valve which includes a core cooling flow path for maximum efficiency cooling through the heat exchanger and de-congealing flow paths wherein fluid is cooled at a lower efficiency through the heat exchanger when it is desirable to heat the fluid, for example if the aircraft has been sitting in sub-zero temperatures for an extended period of time. Further, while the embodiments described herein generally provide air to liquid cooling, the instant embodiments may be used alternatively for liquid to liquid cooling as well.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine outlet, or a component being relatively closer to the engine outlet as compared to an inlet. As used herein, the terms "radial" or "radially" refer to a dimension extending between a center longitudinal axis of the engine and an outer engine circumference.

Referring initially to FIG. 1, a schematic side section view of a gas turbine engine 10 is shown having an engine inlet end 12 wherein air enters the propulsor core 13 which is defined generally by a multi-stage high pressure compressor 14, a combustor 16 and a multi-stage high pressure turbine 18. Collectively, the propulsor core 13 provides power for operation of the gas turbine engine 10.

The gas turbine engine 10 further comprises a fan assembly 28, a low pressure turbine 20, and a low pressure compressor 22. The fan assembly 28 includes an array of fan blades 24 extending radially outward from a rotor disc shown generally at 26. Opposite the inlet end 12 in the axial direction is an exhaust side 33. In one embodiment, gas turbine engine 10 may be available from General Electric Company for jet aircraft use. Although the gas turbine engine 10 is shown in an aviation embodiment, such example should not be considered limiting as the gas turbine 10 may be used for aviation, power generation, industrial, marine or the like. Further, however, the embodiments of the heat exchangers and bypass valves described herein may be used by any of the various types of gas turbine engines described above including, but not limited to, the aircraft embodiments shown in FIGS. 1-3.

In operation air enters through the inlet end 12 of the gas turbine engine 10 and moves through at least one stage of compression in the compressors 22, 14 where the air pressure is increased and directed to the combustor 16. The compressed air is mixed with fuel and burned providing the hot combustion gas which exits the combustor 16 toward the high pressure turbine 18. At the high pressure turbine 18, energy is extracted from the hot combustion gas causing rotation of turbine blades 32 which in turn cause rotation of the high pressure shaft 25. The high pressure shaft 25 passes toward the front of the engine to cause rotation of the one or more compressor 14 stages and continue the power cycle. A low pressure turbine 20 may also be utilized to extract further energy and power additional compressor stages. The fan assembly 28 is connected by the low pressure shaft 27 to a low pressure compressor 22 and the low pressure turbine 20. The fan assembly 28 creates thrust for the gas turbine engine 10. The low pressure and or by-pass air may be used to aid in cooling components of the gas turbine engine 10 as well.

The gas turbine engine 10 is axisymmetrical about engine axis 29 so that various engine components rotate thereabout. An axisymmetrical high pressure shaft 25 extends through the gas turbine engine 10 forward end into an aft end and is journaled by bearings along the length of the high pressure shaft 25. The high pressure shaft 25 rotates about the axis or centerline 29 of the gas turbine engine 10. The high pressure shaft 25 may be hollow to allow rotation of a low pressure turbine shaft 27 therein and independent of the high pressure shaft 25 rotation. The rotation of shafts 25, 27 may be the same or may be in opposite directions. The low pressure shaft 27 also may rotate about the centerline axis 29 of the gas turbine engine 10. During operation, the shafts 25, 27 rotate along with other structures connected to the shaft such as the rotor assemblies of the turbine in order to create power or thrust for various types of turbines used in power and industrial or aviation areas of use.

Figure 2:
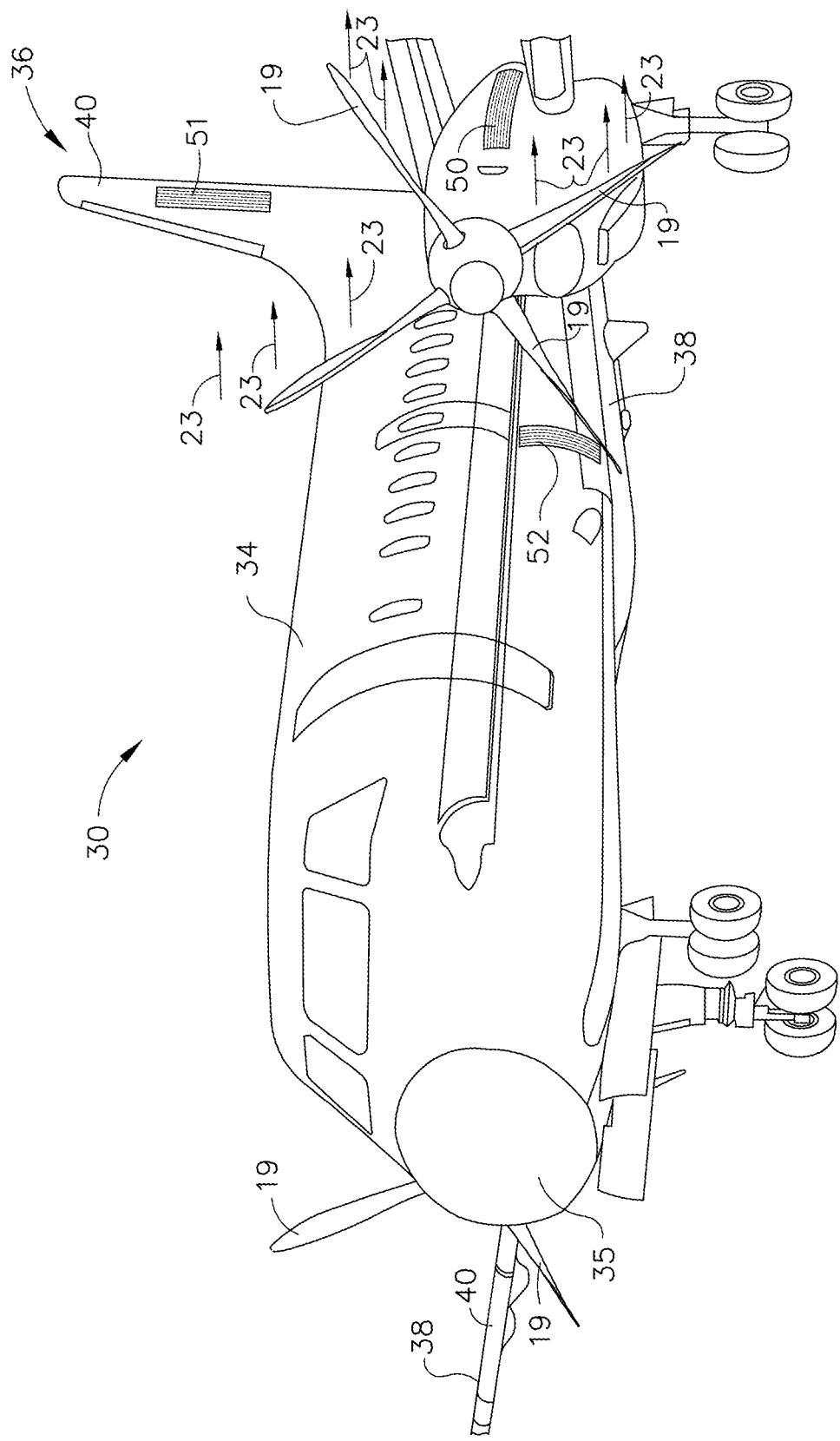
FIG. 2 is an isometric view of an exemplary turbo-prop airplane.

Referring now to FIG. 2, an isometric view of an exemplary aircraft, for example an airplane 30, is shown. The airplane 30 is generally referred to as a turbo-prop airplane and has a differing engine arrangement than previously described wherein a circumferential array of exemplary blades 19 extend radially outward from a nose cone. Each turbo propeller, including blades 19, is operably connected by the shaft, gear box or other transmission to a low pressure shaft 27 (FIG. 1) and low pressure turbine 20 (FIG. 1) to create thrust. The term turbo-prop or turbo-propeller is meant to include both propellers for airplanes and rotors for helicopters. In the depicted embodiment the airplane 30 includes a nose 35 and a fuselage 34 extending between the nose 35 and the tail section 36. At least one wing 38 extends laterally from the fuselage 34. According to the instant embodiments, the wing 38 may extend as a single structure bisected by the fuselage 34 or may be two separate wing structures extending from the fuselage 34. Additionally, the wing 38 may be mounted below the fuselage as depicted or above the fuselage as common with some airplanes. The at least one wing 38 and tail section 36 comprise control surfaces 40 which are utilized to control flight of the airplane 30.

The at least one wing 38 includes gas turbine engines 10 on either side of the fuselage 34. According to other embodiments, the gas turbine engine 10 and propeller assembly may be at the forward or the rearward end of the airplane 30. The gas turbine engines 10 have turbo-props including multiple blades 19 which create thrust for the airplane 30. As the turbo-prop assembly rotates, an airflow path 23 is created extending aft along the airplane 30. The airflow path 23 necessarily causes thrust for the airplane 30 and lift as air passes over the at least one wing 38.

The airplane 30 also comprises at least one heat exchanger 50, for example a conformal surface heat exchanger. The instant embodiment includes the heat exchanger 50 on an outer surface of the engine housing. However, the heat exchanger 50 may be disposed on any surface of the engine wherein the heat exchanger 50 is disposed within the airflow path 23. This allows that heat of engine fluid is removed through the heat exchanger 50 during flight and during stationary engine operation, for example on a tarmac or in a holding pattern on a runway. A second heat exchanger 52 is depicted along the fuselage 34. This is because airflow path 23 from the turbo-prop also moves along the fuselage 34. Similarly, the heat exchangers 50, 52 may be located at various surfaces of the airplane 30 where airflow path 23 moves or where airflow during normal flight may also aid in cooling of engine fluids. The heat exchangers 50, 52 may be oriented in different directions. For example, in some instances, it may be desirable to orient the exchanger in a long axis vertical orientation such as shown with heat exchanger 51, while in other instances it may be desirable to orient the exchanger in a long axis horizontal orientation such as heat exchanger 50. Alternatively, a heat exchanger may be positioned on curved surfaces such as shown with heat exchanger 52. Moreover, the airplane 30 may include various numbers of heat exchangers 50, 51, 52. Further, while a turbo-prop airplane is depicted, the depicted embodiments are also capable of use with a jet aircraft where engine thrust air exiting the engine may pass over the heat exchangers 50, 51, 52. While the heat exchange may not be as good due to higher temperatures of the engine exhaust, the available heat exchange may be enough for limited engine fluid cooling. Additionally, as shown in FIG. 1, the heat exchanger 150 may be located near the engine inlet 12 or axially aft in the by-pass duct.

Figure 3:
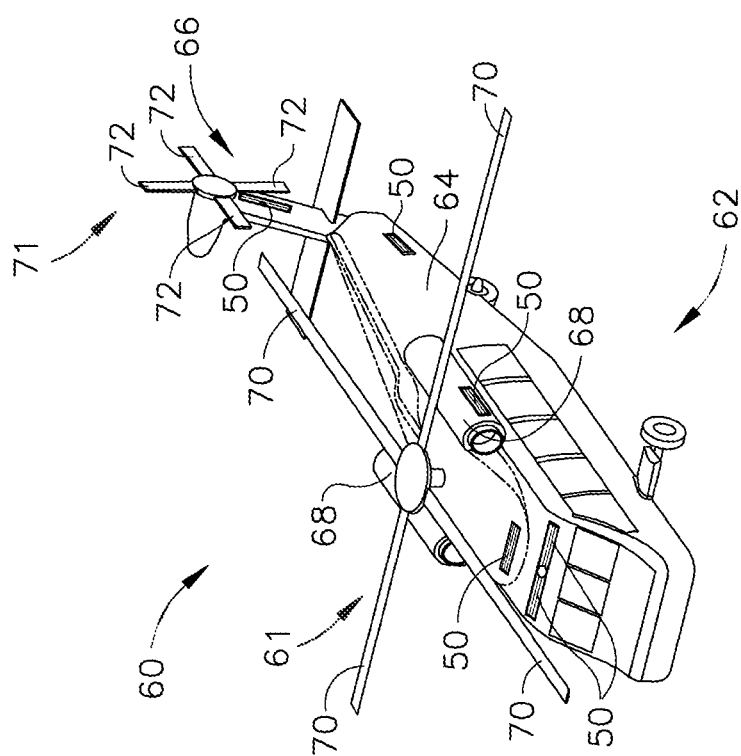
FIG. 3 is an isometric view of one exemplary helicopter.

Referring now to FIG. 3, a further exemplary turbo-prop aircraft is depicted. In this embodiment, the turbo-prop aircraft is a helicopter 60 and the turbo-prop assembly defines at least one primary rotor assembly 61. The helicopter 60 includes a cabin portion 62 defined by a fuselage 64 which extends aft to a tail section 66. The top surface of the helicopter fuselage 64 includes at least one gas turbine engine 68. According to the exemplary embodiment, two gas turbine engines are positioned on the upper side of the fuselage 64 above the cabin 62. The gas turbine engines 68 operate a main or primary rotor assembly 61, which is a form of a turbo-prop. Additionally, at the tail section 66 is a secondary rotor assembly 71. Each of these primary and secondary rotor assemblies 61, 71 include rotors 70, 72 that produce an airflow path 23 as with the airplane 30 of the previous embodiment. In the case of the primary rotors 70, the airflow path is generally downward causing the rotor wash to push the helicopter 60 upward into flight. This downward flow also allows for cooling of appropriately positioned heat exchangers 50. The secondary rotors 72 counter the tendency of the helicopter fuselage 64 due to the rotation of the primary rotors 70. Thus, the airflow path 23 created by the secondary rotors 72 is generally horizontal in nature.

A plurality of heat exchangers 50 are located along the fuselage 64, tail section 66 and housings of the gas turbine engines 68. All of these heat exchangers are placed such that the airflow paths of the rotors 70, 72 move across the heat exchangers 50 resulting in cooling of engine fluids passing through the heat exchangers. Additionally, in the application of these heat exchangers to a helicopter, since the rotors 70, 72 rotate when the gas turbine engines 68 are operating, regardless of whether the helicopter 60 is in flight, the heat exchangers 50 are continuously cooling engine fluids.

These heat exchangers 50, 51, 52, 150 may be flat or contoured about one or more axes so as to match or conform to the contours in the installation location. Additionally, the structures may be circumferential. The heat exchangers 50, 51, 52, 150 may be formed of a one-piece manifold structure having a plurality of integrally formed cooling fins extending outwardly from the heat exchanger so as to allow for engagement of the fins by the airflow path 23 created from the turbo-props of the helicopter 60 and the airplane 30. Alternatively, the heat exchangers 50, 51, 52, 150 may be formed of separate manifold and fin segments which are joined to define a one-piece segment or multiple segments.

Figure 4:
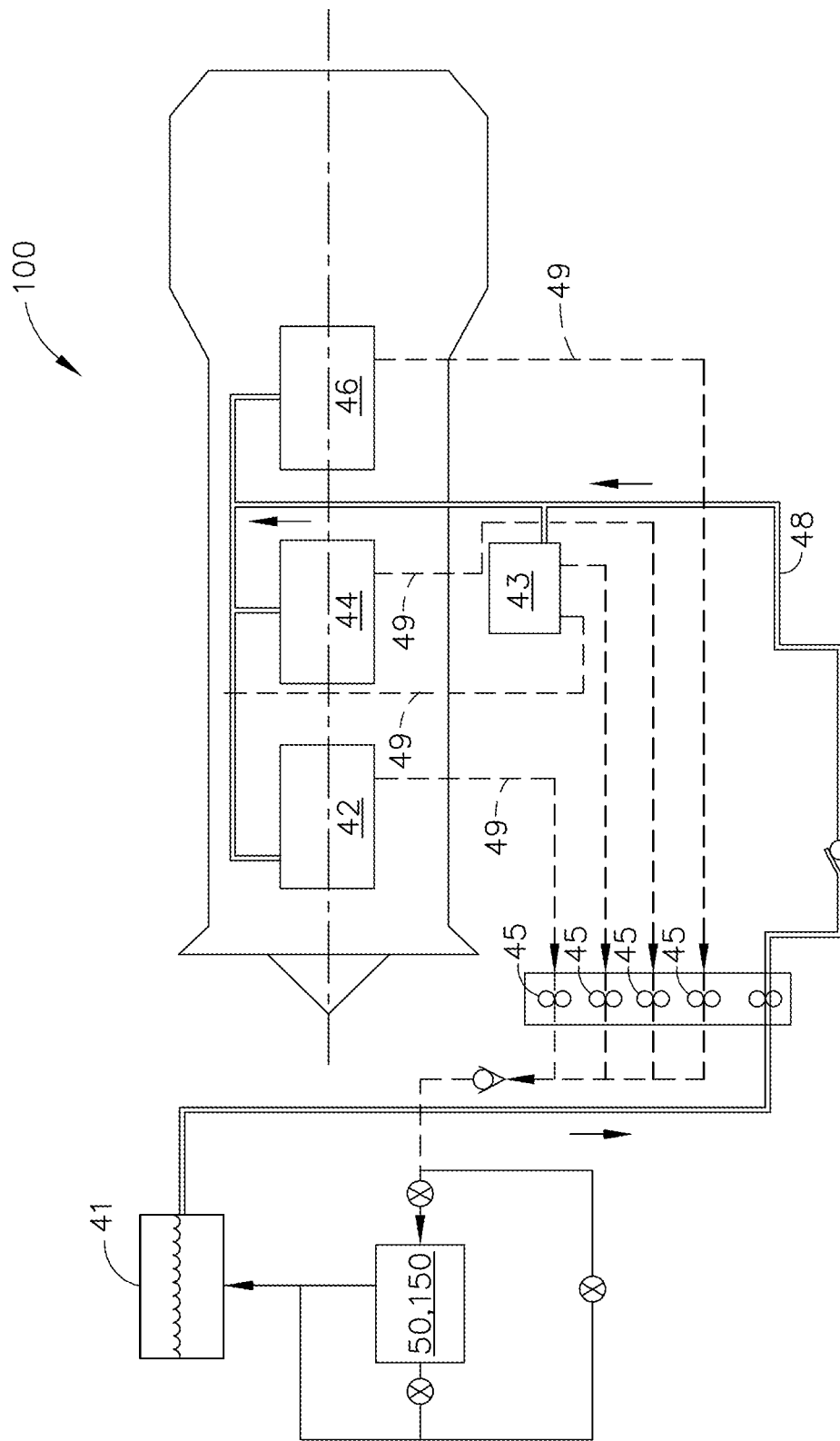
FIG. 4 is an exemplary schematic diagram of a fluid cooling circuit for the conformal heat exchanger.

Referring now to FIG. 4, a schematic view of the cooling circuit 100 and gas turbine engine 10 is depicted. The cooling circuit 100 reduces the temperature of lubricating fluid during normal operation. However, if the engine has been unused in extremely cold temperatures, or is operating in subzero temperature conditions, the lubricating fluid may congeal, or be congealed, and therefore normal fluid cooling may not be desirable. The cooling circuit 100 additionally has a function of decongealing the lubricating fluid. The decongealing process reduces viscosity, operating pressure and resistance to flow.

The gas turbine engine 10 includes various bearings 42, 44, 46 for example, which are supplied engine fluid for cooling through pathways 48 extending between a reservoir 41 and the bearings 42, 44, 46. Fluid may also be supplied to a gear box 43. A plurality of fluid return lines 49 are shown in broken line, which remove heat from the bearings 42, 44, 46 and optionally the gear box 43, and pass through pumps 45 to the heat exchanger 50, 150 for example. Within the heat exchanger 50, 150, cooling of the engine fluid occurs as the propeller washes airflow over the heat exchangers 50, 150 or inlet air moves into inlet end 12 (FIG. 1) or through the by-pass duct and the fluid subsequently returns to the reservoir 41. Various valves are shown schematically through the simplified diagram to depict that various valving arrangements may be utilized, however, these configurations are non-limiting and merely examples of one embodiment. Additionally, although the schematic view depicts heat exchanger 50, 150 any of the heat exchangers defined previously, such as heat exchanger 50, 51, 52, 150 or other embodiments may be substituted in the schematic for the embodiment depicted.

With brief reference again to FIG. 1, a further heat exchanger embodiment is shown. The heat exchanger 150 may be formed by a plurality of heat exchanger segments 204 (FIG. 5) mounted end-to-end covering substantially all (about 320°) of a circumference of a casing near the engine inlet end 12. Alternatively, heat exchanger 150 may be formed by a single heat exchanger segment 204, which covers the same circumferential length. Similarly, the heat exchanger 50, 51, 52 embodiments of FIGS. 2 and 3 may be formed of a plurality of segments arranged closely or may be formed of a single heat exchange structure.

Referring now to FIG. 5, a segment of heat exchanger 150 is depicted. Each heat exchanger segment 204 of heat exchanger 150 includes an extrusion body portion 202 having a first end 210 and an opposite second end 212. Extrusion body portion 202 also includes a first radial surface 220, a second radial surface 222, an upstream wall 226, and an opposite downstream wall 224 with reference to airflow path 23. Extrusion body portion 202 may also include a plurality of cooling fins 230 extending radially inward from the first radial surface 220. Optionally, if heat exchanger 150 is placed proximate to an outer surface of fan duct 17 (FIG. 1), cooling fins 230 may extend either radially inward in the arrangement of FIG. 1, or may extend radially outward as in embodiments of FIGS. 2 and 3, or may include fins that extend both radially inward and radially outward from extrusion body portion 202. Moreover, if heat exchanger 150 is placed proximate to outer surface of splitter 31 (FIG. 1), the cooling fins 230 may extend either radially inward, or may extend radially outward, or may include fins that extend both radially inward and radially outward from extrusion body portion 202. Thus, the first and second radial surfaces 220, 222 may be radially inward or outward depending on the embodiment being used or formed.

Extrusion body portion 202 also includes a plurality of core cooling channels 232 extending lengthwise through each arcuate heat exchanger segment 204. Core cooling channels 232 are selectively sized to receive fluid to be cooled therethrough. In the exemplary embodiment, extrusion body portion 202 includes a plurality of core cooling channels 232, for example twenty-four cooling channels, extending therethrough. Optionally, extrusion body portion 202 may include a quantity greater than or less than the depicted core cooling channels 232 based on the cooling reduction desired. In the exemplary embodiment, core cooling channels 232 have a geometrically shaped cross-sectional profile. According to the instant embodiment, the shape is generally rectangular with curved corners to improve flow characteristics. Alternatively, core cooling channels 232 have a cross-sectional profile that is some other shape such as for example, circular, square, oval, triangular or the like. Furthermore, these openings are generally parallel channels that may all carry the same fluid, or they may be segregated into multiple groups where each group carries a different cooling fluid used for different cooling purposes. For example, one group may carry lubrication fluid for the bearings, and another group might carry a separate cooling fluid for electronic apparatus on the engine.

In the exemplary embodiment, extrusion body portion 202 also includes one or more de-congealing inlet channels 248 and one or more de-congealing outlet channels 250. The term de-congealing refers to the functionality of the channels wherein the congealed fluid, which may be of higher viscosity and resistant to flow is cooled to lesser extent to therefore de-congeal or lower the viscosity and improve flow of the lubricating fluid. Channels 248, 250 extend lengthwise through each arcuate heat exchanger segment 204 of heat exchanger 150 and are selectively sized to receive fluid therethrough. In the exemplary embodiment, channels 248, 250 have a substantially rounded rectangular cross-sectional profile. Alternatively, channels 248, 250 may have a cross-sectional profile that is not rectangular such as for example, circular. Furthermore, channels 248, 250 are parallel channels that may all carry the same fluid, or they may be segregated into multiple groups where each group carries a different cooling fluid used for different cooling purposes. For example, one group may carry lubrication fluid for the bearings, and another group might carry a separate cooling fluid for electronic apparatus on the engine. In the exemplary embodiment, heat exchanger 150 is formed such that core cooling channels 232 are positioned radially inward from de-congealing channels 248, 250 and radially outward from cooling fins 230. Alternatively, core cooling channels 232 may be positioned radially outward from de-congealing channels 248 and 250 and radially inward of cooling fins 230. In another embodiment, core cooling channels 232 may be positioned between de-congealing inlet channel 248 and de-congealing outlet channel 250. Generally, core cooling channels 232 may be positioned at any location within extrusion body portion 202 that facilitates operation of heat exchanger 150 as described herein. However, it may be desirable to position the core cooling channels 232 more proximate to the cooling fins 230 to effectuate more efficient cooling of fluid and in most cases, the core cooling channels 232 will be disposed between the de-congealing channels 248, 250 and the cooling fins 230.

In the exemplary embodiment, cooling fins 230 extend along a width of extrusion body portion 202 between upstream wall 226 and downstream wall 224 and are spaced around heat exchanger 150. As installed in gas turbine engine 10, cooling fins 230 extend axially along centerline axis 29 in parallel with the airflow direction and are arranged radially around an inside or outside surface of gas turbine engine 10. In the exemplary embodiment, cooling fins 230 are coupled to extrusion body portion 202 such that each of the cooling fins 230 is substantially perpendicular to core cooling channels 232 and such that the direction of the fluid channeled through core cooling channels 232 is approximately perpendicular to the direction of airflow channeled through cooling fins 230. More specifically, cooling fins 230 are aligned substantially parallel with centerline axis 29 such that the airflow path 23 channeled into or around inlet end 12 is first channeled between adjacent cooling fins 230.

In one embodiment, extrusion body portion 202 is formed utilizing an extrusion process such that cooling fins 230 are integrally formed with extrusion body portion 202. A fin cutting process, for example, is then conducted to form the cooling fins 230. Optionally, cooling fins 230 may be coupled to extrusion body portion 202 utilizing a welding or brazing procedure, for example. In the exemplary embodiment, extrusion body portion 202 and cooling fins 230 are fabricated from a metallic material, such as aluminum.

To facilitate channeling a fluid through extrusion body portion 202, heat exchanger 150 also includes at least one cooling inlet connection 240 (FIG. 1), and at least one cooling outlet connection 242 (FIG. 1). In the exemplary embodiment, connections 240, 242 (FIG. 1) are each coupled to either first end 210 or second end 212 of heat exchanger segment 204 via a manifold and by-pass valve 136 (FIGS. 6-9) is coupled to heat exchanger segment 204 at opposing end 210 or 212. Alternatively, by-pass valve 136 may be coupled to the same end, either end 210 or 212, as connections 240 and 242 (FIG. 1). By-pass valve 136 may not be coupled to heat exchanger segment 204 at all, but separated from while remaining in flow communication with heat exchanger segment 204. In the exemplary embodiment, at least one cooling inlet connection 240 may be coupled to port and at least one cooling outlet connection 242 may be coupled to port such that ports may be operated to channel lubrication fluid from circuit 100 (FIG. 4) through heat exchanger 150 during desired operating conditions. By-pass valve 136 is configured to channel lubrication fluids through core cooling channels 232 during a first mode of operation, or through de-congealing outlet channel 250 during a second mode of operation, described in further detail below.

Alternatively, heat exchanger 150 can be configured to have a plurality of fluid circuits, each with a cooling inlet connection 240 and a cooling outlet connection 242. These circuits can each have a separate and distinct purpose and carry non-mixing fluids, which are used for cooling different apparatus.

To facilitate securing heat exchanger 150 to gas turbine engine 10, extrusion body portion 202 includes a first tab 290 that is coupled to upstream wall 226 and a second tab 292 that is coupled to downstream wall 224. In the exemplary embodiment, tabs 290, 292 are each fabricated from the same metallic material as extrusion body portion 202 and formed unitarily with extrusion body portion 202 utilizing an extrusion process. Alternatively, tabs 290, 292 are formed as separate components that are attached to extrusion body portion 202 utilizing a welding or brazing procedure.

In the exemplary embodiment, heat exchanger 150 is positioned within gas turbine engine 10 such that the inner wall of fan duct 17 (FIG. 1) includes recesses (not shown) to receive heat exchanger 150. Heat exchanger 150 is coupled to the fan duct 17 such that the inner surface of inner wall is flush with the first radial surface 220 of extrusion body portion 202 at the base of cooling fins 230 to facilitate reducing or eliminating pressure losses caused by heat exchanger 150. More specifically, heat exchanger 150 is coupled within gas turbine engine 10 such that only the cooling fins 230 extend into fan duct 17. As such, the inner wall of fan duct 17 is utilized to substantially cover extrusion body portion 202 such that cooling airflow 23 is channeled only through cooling fins 230. Heat exchanger 150 is formed to include a profile that substantially conforms to a shape of circumferential fan duct 17 or outer surface of splitter 31. Further, the heat exchanger 150 may be formed to conform to a by-pass duct of the gas turbine engine 10. Heat exchanger 150 is then coupled to gas turbine engine 10 such that the inner surface of fan duct 17 is flush with the first radial surface 220 of extrusion body portion 202 at the base of the cooling fins 230 as discussed above. Alternatively, the heat exchanger 150 may be formed to correspond to an outer surface of an aircraft 30, 60 as depicted in the FIGS. 2 and 3 and may be similarly mounted so that cooling fins 230 are exposed to airflow path 23.

FIG. 6 is a schematic illustration of a first mode of operation, shown by solid lines, through exemplary heat exchangers 50,150 shown in FIG. 4. The first mode of operation is the standard operating mode of heat exchanger 50,150 where hot fluid absorbs heat from various engine components and requires cooling through heat exchanger 50,150. During the first mode of operation, hot fluid is channeled from the gas turbine engine 10 into each heat exchanger segment 204 of heat exchanger 50,150 through cooling inlet connection 240. The hot fluid then flows the length of heat exchanger segment 204 through de-congealing inlet channel 248 and is directed by by-pass valve 136 to flow back through heat exchanger segment 204 via core cooling channels 232 and out of heat exchanger 50,150 through cooling outlet connection 242. During the first mode of operation, the hot lubrication fluid is cooled as it flows through core cooling channels 232 by the airflow through cooling fins 230 in fan duct 17 (FIG. 1) such that the fluid is discharged at a substantially cooler temperature to fluid reservoir 41 (shown in FIG. 4). Specifically, the lubrication or cooling fluid is channeled in a substantially circumferential orientation within or around gas turbine engine 10. Simultaneously, cooling airflow supplied into or around inlet end 12 is channeled through cooling fins 230 (FIG. 5) to facilitate reducing an operational temperature of the lubrication fluid channeled through heat exchanger 50,150.

For example, during the first mode of operation the hot lubrication fluid is channeled through core cooling channels 232 wherein the hot fluid transfers its heat to a conductive surface, i.e. extrusion body portion 202 of heat exchanger 150 and thus cooling fins 230 (FIG. 5). The relatively cooler air supplied via inlet end 12 is channeled across and/or through cooling fins 230 wherein the heat is transferred from cooling fins 230 to the airflow channeled through fan duct 17.

FIG. 7 is a schematic illustration of a second mode of operation (shown by solid lines) through heat exchanger 150. The second mode of operation is a de-congealing mode that is utilized when a gas turbine engine 10 is subjected to sub-zero temperatures for extended periods such that the lubrication fluid reaches a predetermined temperature at which it is too viscous to flow easily through core cooling channels 232. In this condition, it is desirable to decrease cooling of the fluid, so that it may heat up and decrease viscosity for improved flow. When the lubrication fluid reaches the pre-determined temperature, it is not hot enough to require cooling through core cooling channels 232, as in the first mode of operation (shown by dotted lines in FIG. 6), and the fluid remaining in core cooling channels 232 may begin to congeal. In the exemplary embodiment, the pre-determined congealing temperature is approximately 100 degrees Fahrenheit. Alternatively, the pre-determined congealing temperature may be any temperature to facilitate operation of heat exchanger 150 as described herein.

Heat exchanger 150 must be kept warm enough to facilitate de-congealing of residual fluid present in each heat exchanger segment 204 of heat exchanger 150 when the fluid is not hot enough to require cooling. During the second mode of operation, the lubrication fluid does require cooling, but still retains some heat from its use in gas turbine engine 10. During the second mode of operation, lubrication fluid is channeled from the gas turbine engine 10 into each heat exchanger segment 204 of heat exchanger 150 through cooling inlet connection 240. The fluid then flows the length of heat exchanger segment 204 through de-congealing inlet channel 248, where by-pass valve 136 directs the flow to by-pass core cooling channels 232 and flow back through heat exchanger segment 204 via de-congealing outlet channel 250 instead of through core cooling channels 232, as in the first mode of operation. The fluid is then discharged from heat exchanger 150 through cooling outlet connection 242 to reservoir 41 (FIG. 4). Alternatively, in order to allow the fluid to flow through the largest cross-sectional area possible and reduce the pressure drop in heat exchanger 150, the second mode of operation may include directing the flow of lubricating fluid back through heat exchanger segment 204 via de-congealing channel 250 and core cooling channels 232.

During the second mode of operation, de-congealing mode, the fluid flowing the entire length of each heat exchanger segment 204 of heat exchanger 150 through de-congealing channels 248, 250 transfers heat to extrusion body portion 202 of each heat exchanger segment 204 such that heat exchanger 150 is heated by conduction to retain heat exchanger 150 at a sufficient temperature to facilitate de-congealing of fluid within heat exchanger 150. The heating of extrusion body portion 202 allows any fluid in core cooling channels 232 to de-congeal such that the fluid flows easily through core cooling channels 232. When the fluid in a single core cooling channel 232 de-congeals, the heat conducted is sufficient enough such that remaining core cooling channels 232 de-congeal quickly thereafter. Moreover, the close proximity of channels 248, 250 containing warm lubricating fluid to core cooling channels 232 provide further heat by conduction, thus decreasing the amount of time required to heat exchanger segment 204 to facilitate de-congealing. Therefore, it is beneficial to locate channels 248, 250 near core cooling channels 232 such that only one wall of extrusion body portion 202 separates each core cooling channel 232 from at least one of channels 248, 250.

If heat exchanger 150 was not heated by channels 248, 250 during the second mode of operation, then the flow of fluid through core cooling channels 232 during the first mode of operation may be obstructed by congealed fluid present in the cold heat exchanger 150. Furthermore, the time required to warm the heat exchanger 150 to facilitate de-congealing of the fluid is longer because of the lower initial temperature than the temperature of heat exchanger 150 having constant flow of warming fluid during the second mode of operation.

Figure 8:
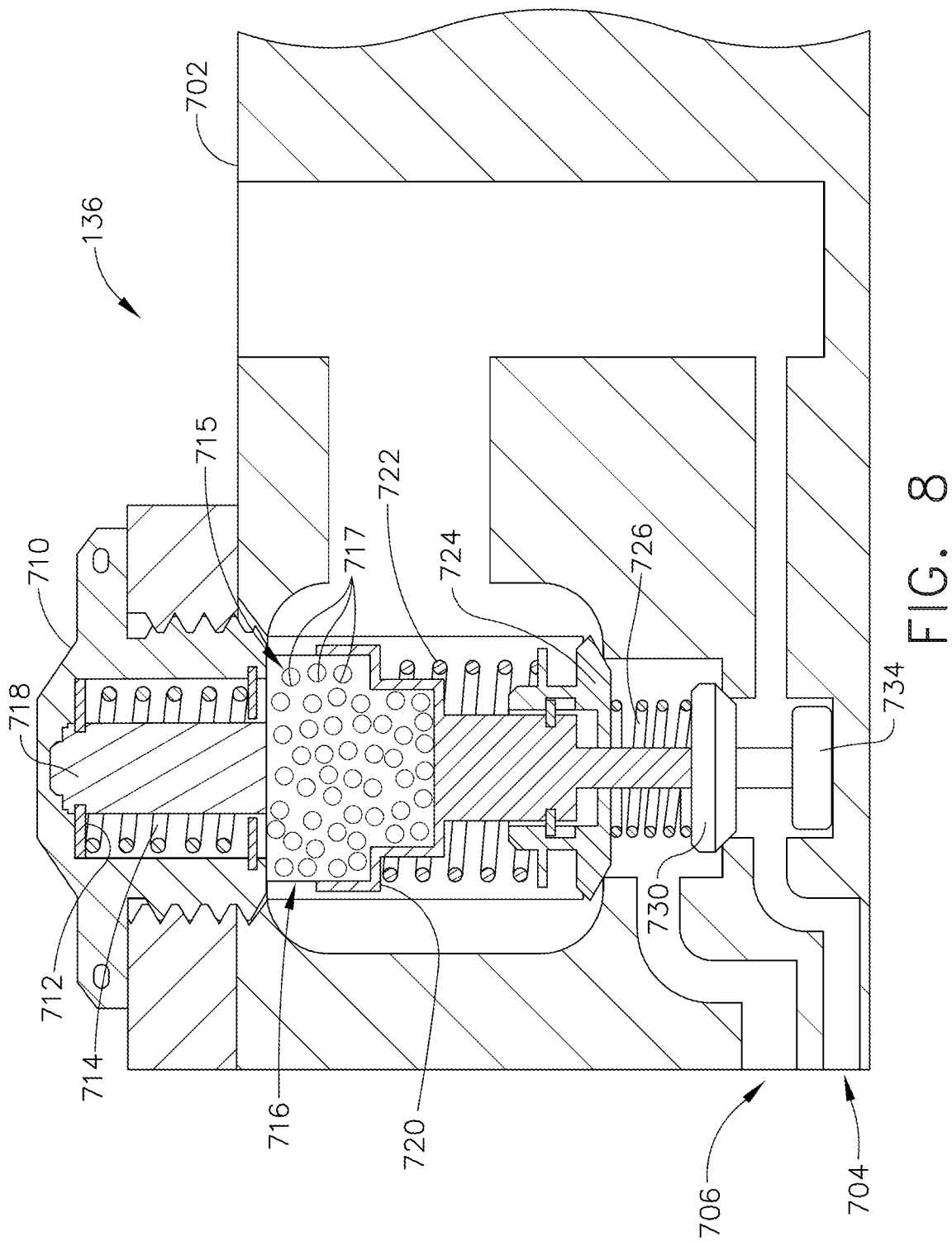
FIG. 8 is a cross-sectional view of an exemplary dual seated by-pass valve in a first mode of operation.

Referring to FIG. 8, one embodiment of an exemplary by-pass valve 136 is depicted. The depicted by-pass valve 136 is shown being used in a normal operating temperature condition. The by-pass valve 136 includes a valve body 702 which includes at least one flow path such as the de-congealing inlet channel 248, for example, which feeds the by-pass valve 136. According to the instant embodiment, the by-pass valve 136 includes two distinct paths through the valve body 702. The core cooling path 704 provides fluid communication to the core cooling channels 232 within the heat exchanger 150. The second path is a de-congealing path 706 that provides a flow path for cooling fluids to the de-congealing outlet channels 250. This is shown in conjunction with FIGS. 6 and 7.

Starting at the top of the valve body 702 is a valve cap 710. The valve cap 710 includes a spring seat 712 wherein a power element return spring 714 is seated. The power element return spring 714 is connected to a power element 716. The power element return spring 714 engages a plate at an upper end of an upper column 718 of the power element 716.

The power element 716 may take various forms and according to some embodiments, may include a wax capsule 715 sensor and actuator. The power element 716 according to some embodiments may include a plurality of wax pellets 717 inside a sealed chamber which uses a solid-liquid transition, which for wax is accompanied by a large increase in volume. The wax pellets 717 are solid at low temperatures, and when the engine heats up, the wax melts and expands. The actuation of the power element 716 is determined by the specific composition of the wax pellets 717. The wax pellets 717 operate in generally two states which are temperature dependent. At higher temperatures, the wax pellets 717 within the wax capsule 715 structure turns to a liquid state which expands and generally moves the power element 716 downwardly in the embodiment depicted to the position shown. With brief reference to FIG. 9, the power element 716 is shown in a cold condition wherein the wax material is in a solid state. In this solid state, the power element 716 retracts and is lifted upwardly in part by spring force of the power element return spring 714. Accordingly, the power element return spring 714 may be a return spring since it has a function of returning the power element 716 to an upper position described further herein.

With reference again to FIG. 8, the power element 716 includes at least one step 720 for seating a relief or over-pressure spring 722. The overpressure spring 722 extends about a lower column beneath the power element 716. The overpressure spring 722 extends downwardly to a de-congealing poppet 724 which may move relative to the lower column. In the depicted position, the de-congealing poppet 724 is closed and the path 706 is closed forcing fluid through path 704. The de-congealing poppet 724 is seated against a ledge within the de-congealing path 706 so that in the normal position depicted, the de-congealing poppet 724 is closed and inhibiting flow through the de-congealing channels 248, 250 of the heat exchanger 150. When the decongealing poppet 724 moves upwardly, the flow path 706 opens.

Beneath the de-congealing poppet 724 is an overpressure poppet 730 which opens when excessive pressure build up occurs within the by-pass valve 136. The lower column extends through the overpressure poppet 730 allowing movement of the overpressure poppet 730 relative to the lower column. This overpressure poppet 730 functions as a safety or pressure relief to allow flow through both the core cooling path 704 and the de-congealing path 706 in extreme conditions. A poppet spring 726 is depicted in a compressed state when the de-congealing poppet 724 is in the seated position depicted. When the de-congealing poppet 724 rises with a change of state in the power element 716, the poppet spring 726 expands as depicted in FIG. 9.

Beneath the overpressure poppet 730 is a core cooling poppet 734. The core cooling poppet 734 is depicted in its normally open position allowing fluid flow to pass to the core cooling channels 232 of the heat exchanger 150. The core cooling poppet 734 is connected to the lower column and is normally open when the operating fluid moving through the valve is at a normal operating temperature.

The embodiment depicted in FIG. 8 shows the positioning of the poppets and flow for the by-pass valve 136 in a normal operating condition wherein cooling fluid, such as oil, is at a high temperature requiring cooling. This is a normal condition during operation of the gas turbine engine 10.

Figure 9:
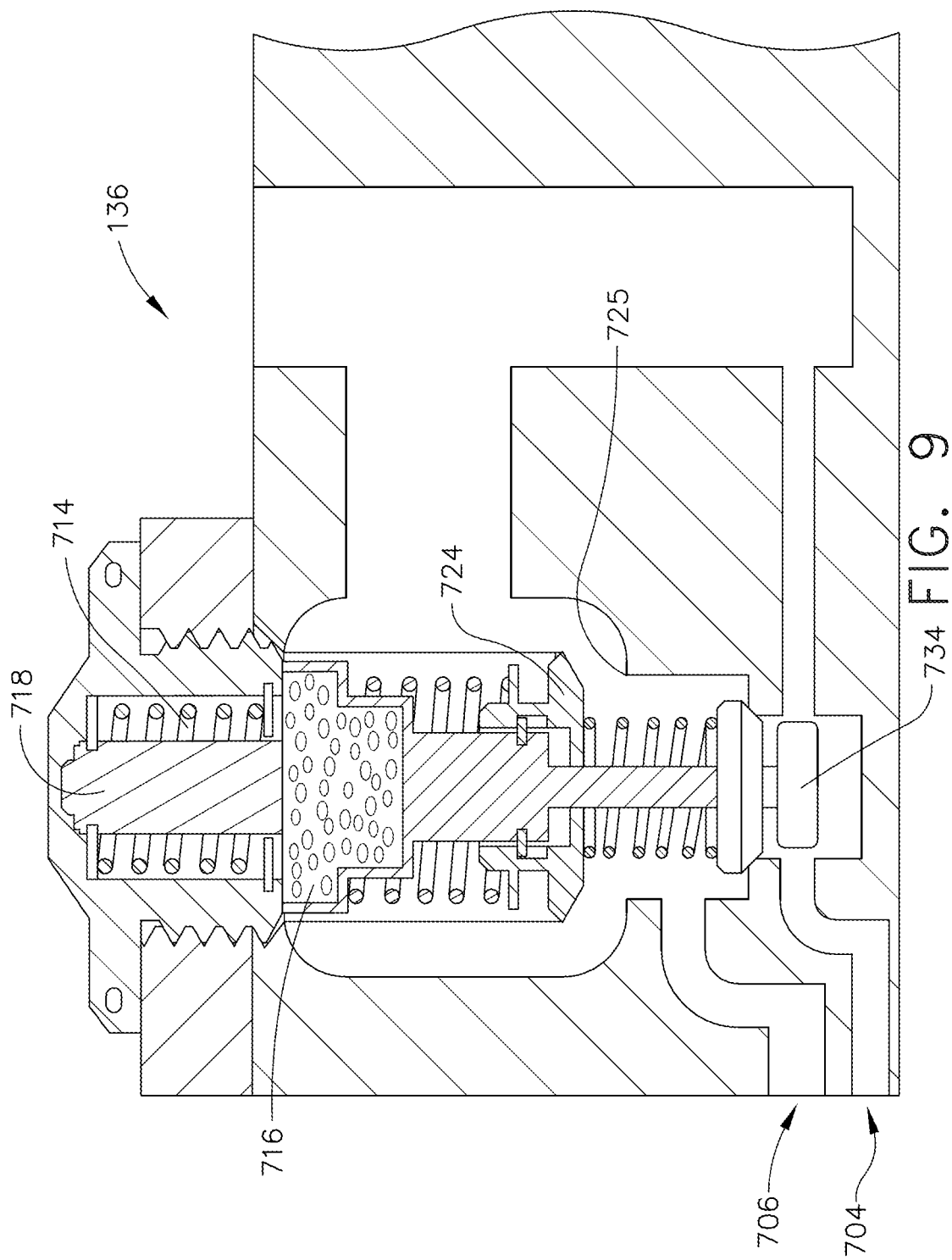
FIG. 9 is a cross-sectional view of an exemplary dual seated by-pass valve in a second mode of operation.

With reference to FIG. 9, the by-pass valve 136 is depicted in an alternate operating condition wherein the gas turbine engine 10 may have been in sub-zero temperatures for several hours and not have been operated or wherein the fluid temperature is low enough to have fluid congealing conditions. This may result in congealing of the cooling fluid which renders the fluid of high viscosity and increases operating pressure and resistance to flow. The embodiment depicted in FIG. 9 serves to overcome this problem by directing substantially all of the cooling fluid through the de-congealing channels 248, 250 which results in less efficient cooling of the cooling fluid and therefore, causes the cooling fluid temperature to rise. This results in decreasing of the viscosity of the cooling fluid and inhibits freezing conditions described previously in this disclosure. In the embodiment depicted in FIG. 9, the power element 716 is in a cold condition such that the wax structure within the capsule of the power element 716 is solidified causing the power element 716 to retract. Such retraction may be aided by upward force of the return spring 714 pulling on the power element 716. With the raising or lifting of the power element 716, the de-congealing poppet 724 is lifted from its seat 725 allowing flow through the de-congealing path 706 to pass to the congealing circuit and associated channels 248, 250. Beneath the power element 716 is a core cooling poppet 734 which is lifted from its position depicted in FIG. 8 and to a second position which blocks flow through the first path to the core of the heat exchanger 150. Thus, from the comparison of FIG. 8 and FIG. 9, one skilled in the art will understand that the normal condition allows flow through the core cooling channels 232 of the heat exchanger and precludes flow through the de-congealing channel 248, 250 while in the cold operating condition depicted in FIG. 9, flow of the cooling fluid is inhibited from passage through the core cooling path 704 and moves instead through the de-congealing path 706 to the congealing channel 248, 250.

The foregoing description of structures and methods has been presented for purposes of illustration. It is not intended to be exhaustive or to limit the innovation to the precise steps and/or forms disclosed, and obviously many modifications and variations are possible in light of the above teaching. Features described herein may be combined in any combination. Steps of a method described herein may be performed in any sequence that is physically possible. It is understood that while certain embodiments of methods and materials have been illustrated and described, it is not limited thereto and instead will only be limited by the claims, appended hereto.

What is claimed is:

1. A heat exchanger circuit, comprising:
a heat exchanger having a body comprising:
a plurality of cooling fins for the heat exchanger;
a plurality of core cooling channels within the body;
a plurality of de-congealing channels in fluid communication with the plurality of core cooling channels; and
a by-pass valve in fluid communication with the plurality of core cooling channels and the plurality of de-congealing channels, the by-pass valve further comprising:
a valve body;
a power element extending through the valve body;
a de-congealing flow path passing through the valve body;
a core cooling flow path passing through the valve body;
a de-congealing poppet in fluid communication with the de-congealing flow path and operably connected to the power element, the de-congealing poppet being movable between a closed position and an open position that allows for fluid flow to the plurality of de-congealing channels; and
a core cooling poppet in fluid communication with the core cooling flow path and operably connected to the power element, the core cooling poppet being movable between a closed position and an open position that allows for fluid flow to the plurality of core cooling channels.

2. The heat exchanger circuit of claim 1, wherein the power element is biased by a return spring.

3. The heat exchanger circuit of claim 2 further comprising an overpressure spring engaging the de-congealing poppet.

4. The heat exchanger circuit of claim 3 wherein the de-congealing poppet is spring biased toward the closed position.

5. The heat exchanger circuit of claim 3 further comprising an overpressure poppet disposed between the de-congealing flow path and the core cooling flow path.

6. The heat exchanger circuit of claim 5 wherein the overpressure spring is configured to engage the overpressure poppet.

7. The heat exchanger circuit of claim 1 wherein the power element comprises a wax capsule.

8. The heat exchanger circuit of claim 7 wherein the wax capsule is configured to change state based on a temperature of the fluid passing therethrough.

9. The heat exchanger circuit of claim 1 wherein the core cooling poppet is closed and the de-congealing poppet is open when a temperature of the fluid is at or below a predetermined threshold temperature.

10. The heat exchanger circuit of claim 9 wherein the core cooling poppet is open and the de-congealing poppet is closed when the temperature of the fluid exceeds the predetermined threshold temperature.

11. The heat exchanger circuit of claim 10 further comprising an overpressure poppet configured to open to relieve pressure when a pressure of the fluid exceeds a predetermined threshold pressure.

12. The heat exchanger circuit of claim 1, wherein the core cooling poppet is connected to the power element, and the de-congealing poppet moves relative to the power element.

13. A heat exchanger circuit, comprising:
a heat exchanger having a body comprising:
a plurality of cooling fins for the heat exchanger;
a plurality of core cooling channels within the body arranged closer to the plurality of cooling fins, with the plurality of core cooling channels having a cooling inlet connection and a cooling outlet connection;
a plurality of de-congealing channels in fluid communication with the cooling inlet connection and the cooling outlet connection, the de-congealing channels having a de-congealing inlet and a de-congealing outlet; and
a by-pass valve in fluid communication with the cooling inlet connection, the cooling outlet connection, the de-congealing inlet, and the de-congealing outlet, and configured to selectively channel fluid through the plurality of core cooling channels during a first mode of operation and through the plurality of de-congealing channels during a second mode of operation.

14. The heat exchanger circuit of claim 13 wherein the by-pass valve further comprises a movable de-congealing poppet that selectively allows for fluid flow to the plurality of de-congealing channels, and a movable core cooling poppet that selectively allows for fluid flow to the plurality of core cooling channels.

15. The heat exchanger circuit of claim 14 wherein the by-pass valve further comprises:
   a valve body;
   a power element extending through the valve body;
   a de-congealing flow path passing through the valve body; and
   a core cooling flow path passing through the valve body.

16. The heat exchanger circuit of claim 15 wherein at least one of the de-congealing poppet or the core cooling poppet are operably coupled to the power element.

17. The heat exchanger circuit of claim 15 wherein the power element comprises a wax capsule configured to change state based on a temperature of the fluid passing therethrough.

18. The heat exchanger circuit of claim 15 wherein the core cooling poppet is open and the de-congealing poppet is closed during the first mode of operation when a temperature of the fluid exceeds a predetermined threshold temperature.

19. The heat exchanger circuit of claim 15 wherein the core cooling poppet is closed and the de-congealing poppet is open during the second mode of operation when a temperature of the fluid is at or below a predetermined threshold temperature.

20. The heat exchanger circuit of claim 15 wherein the core cooling poppet is connected to the power element, and the de-congealing poppet is movable relative to the power element.

* * * * *